April 23, 1940.  A. N. PORTER  2,198,348
COUNTERBALANCE
Filed April 6, 1938  2 Sheets-Sheet 1
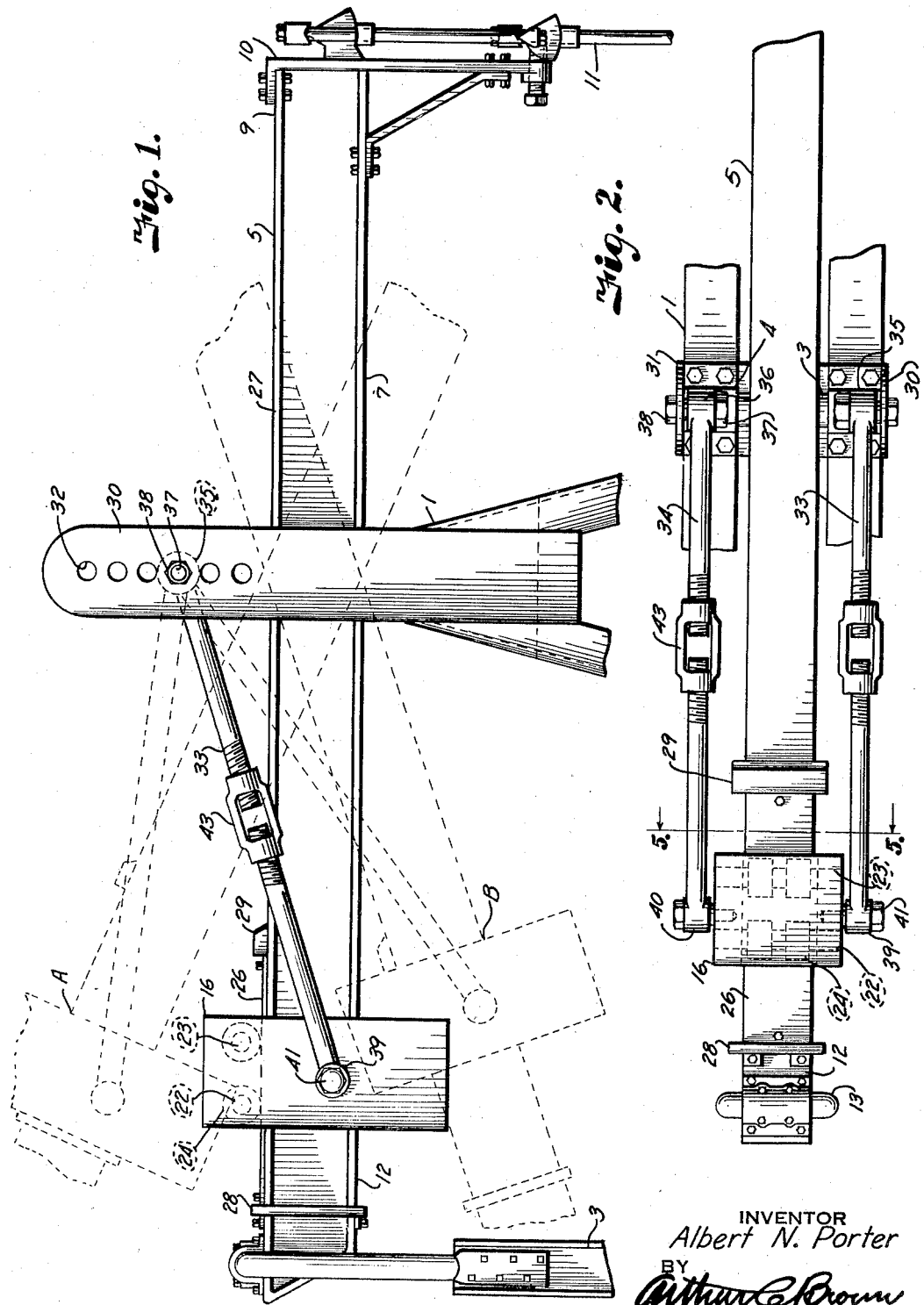
INVENTOR
Albert N. Porter
BY Arthur C. Brown
ATTORNEY April 23, 1940.　　A. N. PORTER　　2,198,348
COUNTERBALANCE
Filed April 6, 1938　　2 Sheets-Sheet 2
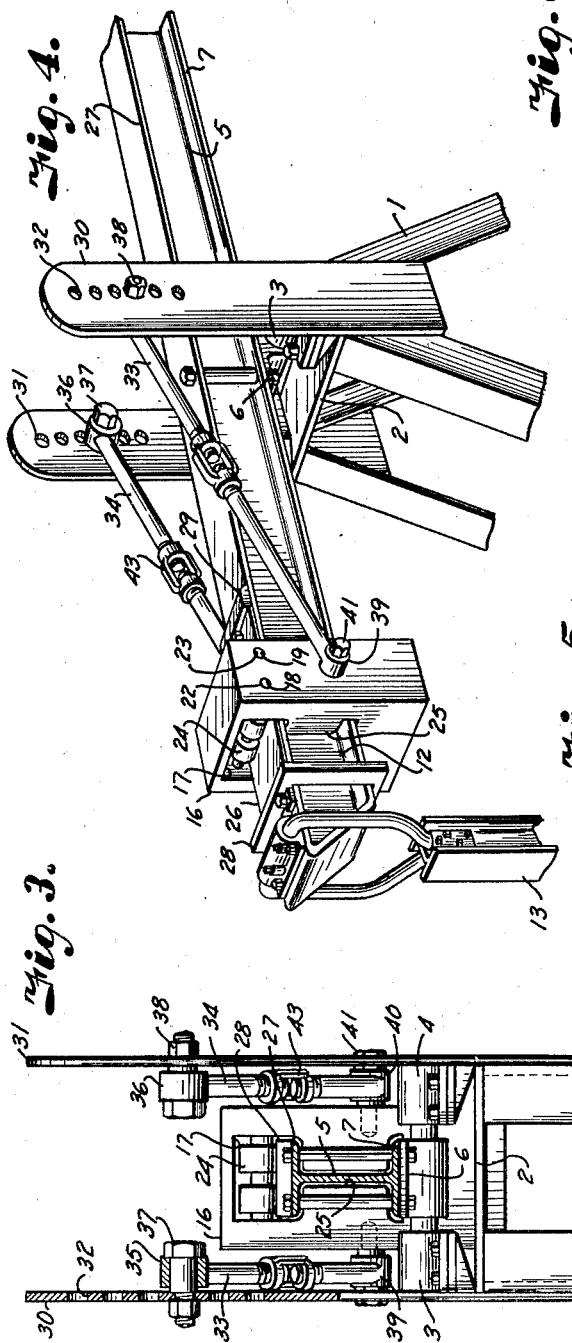
INVENTOR
Albert N. Porter
BY
Arthur C. Brown
ATTORNEY Patented Apr. 23, 1940

2,198,348

UNITED STATES PATENT OFFICE 2,198,348

COUNTERBALANCE

Albert N. Porter, Tulsa, Okla., assignor to J. F. Darby, Tulsa, Okla.

Application April 6, 1938, Serial No. 200,392

9 Claims. (Cl. 74—41)

This invention relates to counterbalances, and more particularly to a device of that character adaptable for counteracting variations in loads for example on oil well equipment such as pumping units, pumping jacks, and walking beams, the principal objects of the present invention being to provide a delicately adjustable, efficient, convenient and economical counterbalance for such purposes.

In accomplishing these and other objects of the invention, I have provided improved details of structure, the preferred form of which is illustrated in the accompanying drawings, wherein:

Fig. 1 is a fragmentary side elevational view of an oil well pumping unit having a counterbalance embodying the features of the present invention and showing the relative positions of the counterbalance in dotted lines with respect to variations in load on the unit.

Fig. 2 is a fragmentary plan view of the counterbalance showing its relation to a walking beam.

Fig. 3 is a vertical cross-section through the Samson post and walking beam, illustrating the counterbalance in end elevation.

Fig. 4 is a perspective view illustrating the mounting of a counterbalance embodying this invention on a walking beam and its relation to the pitman end of the beam.

Fig. 5 is a detail vertical cross-sectional view through the walking beam on the line 5—5, Fig. 2, part of the counterbalance being broken away to better illustrate its construction.

Fig. 6 is a detail horizontal cross-section through the counterbalance and walking beam particularly illustrating the support for the counterbalance relative to the beam.

Referring more in detail to the drawings:

1 designates a standard, for example a Samson post having a header plate 2 on which spaced aligned bearing members 3 and 4 are mounted. A walking or like beam 5 preferably of I type having a bearing plate 6 on the lower flanges 7 spaced from the ends thereof is fulcrummed on the bearings 3 and 4 by providing the bearing plate 6 with a suitable trunnion 8, the opposite ends of which are pivotally mounted in the bearings 3 and 4.

One end 9 of the beam 5 is provided with a load supporting member such as the beam hanger 10 adaptable for supporting various types of loads for example a string of rods suspended from the hanger 11, and the other end 12 of the beam is connected with an actuating element such as the pitman 13 as by a pitman stirrup 14 pivotally mounted in a bearing 15 fixed to the end 12 of the beam.

On the downstroke of the end 9 of the beam in response to gravity pull of the load on the beam hanger 10, the beam rocks on its fulcrum, i. e., the standard to the position indicated at A in dotted lines in Fig. 1. On the upstroke of the walking beam to the position indicated in dotted lines at B, Fig. 1, sufficient actuating power is required to not only overcome the weight of the rods, but also the weight of the column of fluid being lifted.

Counterbalances on walking beams to aid in lifting the combined weight of a string of rods and a column of fluid are not unknown, but it has heretofore been the practice to fix a counterbalance at the end of the walking beam opposite the load.

The present invention contemplates movably mounting a counterbalance 16 on the end 12 of a walking beam or on any similarly fulcrummed rocking member carrying a load. The counterbalance 16 in the present instance is of generally rectangular conformation and of calculated weight to render it capable of counteracting variations in load on the opposite end of the beam.

As particularly illustrated in Fig. 3, the counterbalance is provided with a cutout portion 17 and spaced aligned bearing sockets 18 and 19 for seating the trunnions Fig. 6, of shafts 22 and 23 on which spaced rollers 24 are mounted. The counterbalance is further provided with a cutout portion 25 shaped to conform to the beam in such a manner that the counterbalance may be slidably mounted on the beam.

As a matter of practice, a wear plate 26 is mounted on the upper flanges 27 of the walking beam to provide a replaceable track for the rollers 24 and thus protect the walking beam. Spaced stop members 28 and 29 are also provided on the walking beam, one of which limits the run of the counterbalance in the direction of the beam hanger, and the other of which limits sliding or rolling movement of the counterbalance in the other direction, that is, toward the pitman.

In order to further control sliding movement of the counterbalance on the walking beam, side irons 30 and 31 are mounted on the Samson post in oppositely disposed upwardly extending relation thereto and which have spaced aligned series of apertures 32. Links 33 and 34 are pivotally mounted in a selected pair of opposite apertures of the side irons, the links being provided with bored bosses 35 and 36 for receiving fastening devices such as the bolts 37, the bolts being passed through and retained in the selected apertures as by nuts 38. The links are thus pivotally and adjustably mounted on the side irons.

The rearward ends of the links are provided with similarly bored bosses 39 and 40 for receiving bolts or the like 41 which have suitable mounting 42 in oppositely disposed aligned relation on the counterbalance.

Where delicate adjustments are desirable, the links are broken and the adjacent portions are adjustably connected by turnbuckles 43 to more accurately control the motion of the counterbalance on the walking beam and thus more efficiently compensate for variations in load at the other end of the walking beam.

The operation of an apparatus constructed as described is as follows:

Assuming oil well equipment to have a load applied thereto and an actuating power element also applied thereto for moving the load, an example of which is illustrated in the present walking beam, beam hanger and actuating pitman, the power element is actuated to permit the pitman end 11 of the walking beam to be raised as a result of pivoting the walking beam on the Samson post in response to gravitation of a string of rods on the beam hanger into a well, not shown. The position of the walking beam under this condition is illustrated in dotted lines at A in Fig. 1. The links upon such movement of the walking beam pivot upwardly on their pivot points in the apertures of the Samson post side irons and since such pivot points are spaced upwardly from the fulcrum of the walking beam, the peripheries of the arcs defined by movement of the outer ends of the links and the end 12 of the walking beam approach each other. Since the counterbalance is fixed to the links and slidably mounted on the walking beam, the counterbalance is forced outwardly to its extreme outer position. At this time the end 12 of the walking beam is in its uppermost position and the end 9 of the walking beam is in its lowermost position.

In response to actuation of the pitman, the end 12 of the walking beam is then forced downwardly and is aided in such movement by the counterbalance while in its maximum outermost effective position. During such downward movement of the end 12 of the beam and the counterbalance, sufficient power is required to overcome the weight of the rods depending from the beam hanger and also the weight of a full column of fluid, such as oil, which is also to be lifted by the rods.

As the walking beam approaches its center position, as illustrated in full lines in Fig. 1, the column of fluid is being discharged from the well, the walking beam is gradually relieved of its duty in lifting the full column. An equilibrium is substantially reached between the total load and effect of the counterbalance when the walking beam is in its center position and such equilibrium is compensated for by movement of the counterbalance to its center position between the stop members on the walking beam due to the separation of the arcs of travel at the outer ends of the walking beam and links on the downstroke of the end 12 of the beam. Continued downward movement of the end 12 of the walking beam lifts the rods to the top of their stroke, at which time they are permitted to gravitate again into the well and the operation is again repeated.

At the bottom of the stroke at the end 12 of the walking beam, the pitman would normally be required to raise the total weight of the counterbalance, actual work being required in such an operation. Due, however, to the continued movement of the counterbalance toward the center of the walking beam as an incident to being drawn along the walking beam by the links, the pitman is relieved of that duty and the weight of the rods is employed to do this work.

It is apparent that the counterbalance is reciprocated upwardly and inwardly on the end 12 of the walking beam upon each complete stroke of the walking beam and that the power normally required for lifting the string of rods and column of fluid is substantially reduced.

Finer adjustments of leverage moments may easily be effected by shifting the pivot points of the links either upwardly or downwardly on the side irons by mounting the ends thereof in any pair of apertures and, further, by manipulating the turnbuckles on the links.

What I claim and desire to secure by Letters Patent is:

1. An apparatus of the character described including a standard, a walking beam fulcrumed on said standard, a beam hanger at one end of the walking beam, a pitman at the other end of the walking beam for actuating the same, side irons on the standard, links adjustably connected with the side irons, a counterbalance movable on the walking beam adjacent the pitman and having pivotal connection with the links, and means for adjusting the length of the links to selectively vary the working position of the counterbalance on the walking beam relative to the counterbalance.

2. An apparatus of the character described including a standard, a walking beam fulcrumed on said standard, a beam hanger at one end of the walking beam, a pitman at the other end of the walking beam for actuating the same, links pivotally connected with the standard, a counterbalance on the walking beam adjacent the pitman and having pivotal connection with the links, rollers on the counterbalance engaged with the walking beam for movably mounting the counterbalance on the walking beam, and a wear plate mounted on the walking beam forming a track for the rollers.

3. An apparatus of the character described including a standard, a walking beam fulcrumed on said standard, a beam hanger at one end of the walking beam, a pitman at the other end of the walking beam for actuating the same, links pivotally mounted on the standard, a counterbalance on the walking beam adjacent the pitman and engaged with the links, rollers on the counterbalance engaged with the walking beam, stop members on the walking beam engageable with the counterbalance for limiting extent of movement of the counterbalance, and a wear plate mounted on the walking beam between said stop members forming a track for the rollers.

4. An apparatus of the character described including a standard, a walking beam fulcrumed on said standard, a beam hanger at one end of the walking beam, a pitman at the other end of the walking beam for actuating the same, links pivotally mounted on the standard, a counterbalance on the walking beam adjacent the pitman and engaged with the links, rollers on the counterbalance engaged with the walking beam for movably mounting the counterbalance on the walking beam, stop members on the walking beam engageable with the counterbalance for limiting extent of movement of the counterbalance, a wear plate mounted on the walking beam between said stop members forming a track for the rollers, and means for adjustably mounting the links on the standard relative to the walking beam.

5. An apparatus of the character described including a standard, a walking beam fulcrumed on said standard, a beam hanger at one end of the walking beam, a pitman at the other end of the walking beam for actuating the same, links pivotally mounted on the standard, a counterbalance on the walking beam adjacent the pitman and engaged with the links, rollers on the counterbalance engaged with the walking beam for movably mounting the counterbalance on the walking beam, stop members on the walking beam engageable with the counterbalance for limiting extent of movement of the counterbalance, a wear plate mounted on the walking beam between said stop members forming a track for the rollers, means for adjustably mounting the links on the standard relative to the walking beam, and means for adjusting the links relative to the counterbalance.

6. In an apparatus of the character described, a support, a beam, fulcruming means for mounting the beam about a fixed axis on the support, load connecting means on one end of the beam having fixed spacing with respect to the fulcruming means, a counterbalance movably supported on the opposite end of the beam, means for oscillating the beam, and counterbalance shifting means having connection with the counterbalance and connection with the support at a point offset from said axis of oscillation to maintain a relatively fixed spacing between the counterbalance and said point of connection with the support whereby said counterbalance is bodily shifted on the beam to vary the counterbalancing moment responsive to oscillation of the beam.

7. In an apparatus of the character described, a support, a beam, fulcruming means mounting the beam for oscillation about a fixed axis on the support, load connecting means on one end of the beam having fixed spacing with respect to said fulcruming means, means for oscillating the beam, a counterbalance movably supported on the opposite end of the beam, said support having a series of connections offset with respect to the axis of oscillation, a connecting link adapted for engagement with one of said connections of the support, and means carried by the counterbalance for connecting the opposite end of said link connection to maintain a predetermined fixed spacing between the counterbalance and said point of connection with the support whereby the counterbalance is bodily shifted on the beam to vary the counterbalancing moment responsive to oscillation of the beam.

8. In an apparatus of the character described, a support, a beam, fulcruming means mounting the beam on the support for oscillation about a fixed axis on the support, load connecting means on one end of the beam having fixed spacing with respect to said fulcruming means, a counterbalance movably supported on the opposite end of the beam, a counterbalance shifting link, means pivotally connecting one end of the link with the support at a point offset from said axis of oscillation, and means on the counterbalance pivotally connected with the opposite end of said link.

9. In an apparatus of the character described, a support, a beam, fulcruming means mounting the beam for oscillation about an axis on the support, load connecting means on one end of the beam, means for oscillating the beam on said fulcruming means, a counterbalance movably supported on the opposite end of the beam, and a link connection having one end pivotally connected with the support at a point offset from the fulcruming means and having its opposite end pivotally connected to the counterbalance, said connecting link having an adjusting means intermediate said point of connection for selectively varying the length of said linkage.

ALBERT N. PORTER.